(12) United States Patent
Dasoju et al.

(10) Patent No.: US 8,929,211 B2
(45) Date of Patent: Jan. 6, 2015

(54) HOT-SWAPPING NETWORK PORT FUNCTIONALITY

(75) Inventors: Kiran Dasoju, Milpitas, CA (US); Jeff Dull, San Jose, CA (US)

(73) Assignee: Broadcom Corporation, Irvine, CA (US)

( * ) Notice: Subject to any disclaimer, the term of this patent is extended or adjusted under 35 U.S.C. 154(b) by 1276 days.

(21) Appl. No.: 12/537,572

(22) Filed: Aug. 7, 2009

(65) Prior Publication Data

US 2010/0290457 A1 Nov. 18, 2010

Related U.S. Application Data

(60) Provisional application No. 61/177,623, filed on May 12, 2009.

(51) Int. Cl.
*H04L 12/26* (2006.01)
*H04L 12/939* (2013.01)
*H04L 12/935* (2013.01)

(52) U.S. Cl.
CPC .............. *H04L 49/552* (2013.01); *H04L 49/30* (2013.01)
USPC ....................................................... 370/230

(58) Field of Classification Search
CPC ................................ H04L 47/10; H04L 47/25
USPC .......................................... 370/230, 219, 389
See application file for complete search history.

(56) References Cited

U.S. PATENT DOCUMENTS

| | | | | |
|---|---|---|---|---|
| 6,667,977 | B1* | 12/2003 | Ono | 370/392 |
| 7,558,874 | B1* | 7/2009 | Kodukula et al. | 709/237 |
| 7,996,572 | B2* | 8/2011 | Blankenship et al. | 710/5 |
| 8,064,471 | B2* | 11/2011 | Mishra et al. | 370/413 |
| 8,270,401 | B1* | 9/2012 | Barnes et al. | 370/389 |
| 2002/0054602 | A1* | 5/2002 | Takahashi et al. | 370/412 |
| 2006/0047800 | A1* | 3/2006 | Caveney et al. | 709/223 |
| 2007/0211628 | A1* | 9/2007 | Ikeda et al. | 370/230 |

* cited by examiner

*Primary Examiner* — Dang Ton
*Assistant Examiner* — Kevin Lee
(74) *Attorney, Agent, or Firm* — McDermott Will & Emery LLP (57) ABSTRACT

Methods and apparatus for swapping functionality modes of a network data link are disclosed. An example method includes, in a network device, supporting a plurality of active network data links that includes a given network data link, where the given network data link is operated in accordance with a first mode of functionality. The example method further includes, while the other network data links of the plurality remain active: (i) placing the given network data link in a quiescent state; (ii) allocating, in a data port of the given network data link, cell buffer space in accordance with a second mode of functionality; (iii) programming a memory management unit (MMU) of the network switch device in accordance with the second mode of functionality for the given network data link; (iv) allocating, in an egress port (EP) of the network switch device, cell buffer space in accordance with the second mode of functionality for the given network data link; (v) bringing the given network data link out of the quiescent state; and (vi) operating the given network data link in accordance with the second mode of functionality.

20 Claims, 6 Drawing Sheets

| SLOT | PORT | STOP |
|---|---|---|
| 0 | PORT 110 | |
| 1 | PORT 115 | |
| 2 | PORT 105 | |
| 3 | PORT 105 | |
| 4 | PORT 105 | |
| 5 | PORT 105 | |
| ⋮ | | |
| 254 | | * |
| 255 | | |

HOT-SWAPPING NETWORK PORT FUNCTIONALITY

CROSS REFERENCE TO RELATED APPLICATIONS

This application claims the benefit, under 35 U.S.C. §119(e), of U.S. Provisional Patent Application Ser. No. 61/177,623, filed on May 12, 2009. The disclosure of U.S. Provisional Patent Application Ser. No. 61/177,623 is incorporated by reference herein in its entirety.

TECHNICAL FIELD

This description relates to data and network communications.

BACKGROUND

Data communication and the use of data communication networks continue to grow at a rapid pace. As part of this growth, there is a desire for ever increasing data transmission speeds as well as corresponding increases in the volume of data traffic carried over such data networks. Various techniques may be employed in order to facilitate such increases in data communication speed as well as increases in data traffic volume.

For instance, advances in technology (e.g., semiconductor technology) allow network elements included in such data communication networks to be designed to run at faster speeds than previous network elements. As new technologies and approaches are introduced, those techniques are often implemented in conjunction with previous techniques and approaches. For instance, as 10 Gigabit/second (Gig) data communication connections are introduced into existing data networks, those 10 Gig data connections are usually implemented along with 1/2.5 Gig data connections.

In networks that include different modes of functionality (e.g., 10 Gig connection and 1/2.5 Gig connections) it is often advantageous to change modes of functionality for network data links operating in the network. For instance, a 10 Gig network data link that operates using four 2.5 Gig data traffic lanes may be converted to four individual 1/2.5 Gig data traffic lanes. Likewise, a network data link that includes four 2.5 Gig data traffic lanes may be converted to a single 10 Gig network data link.

Changes in functionality modes for data network links (e.g., between 10 Gig and 1/2.5 Gig) may be implemented on network devices, such as network switches, that are used for processing data traffic in a data network. Such network devices may include a number of data ports for operating a number of network data links (e.g., tens to hundreds of links). In certain embodiment, those data links may operate with fixed modes of functionality and/or may be configured to be switched between modes of functionality.

One drawback of current approaches is that in order to change modes of functionality for a single network data link, an entire network device (e.g., network switch) that includes the network data link that is being changed must be shut down and restarted. This requires that every network data link on the network device be stopped while the functionality mode of a single link is changed.

SUMMARY

A system and/or method for data communication, substantially as shown in and/or described in connection with at least one of the figures, as set forth more completely in the claims. In the figures, like reference numbers indicate like elements.

DETAILED DESCRIPTION

Figure 1A:
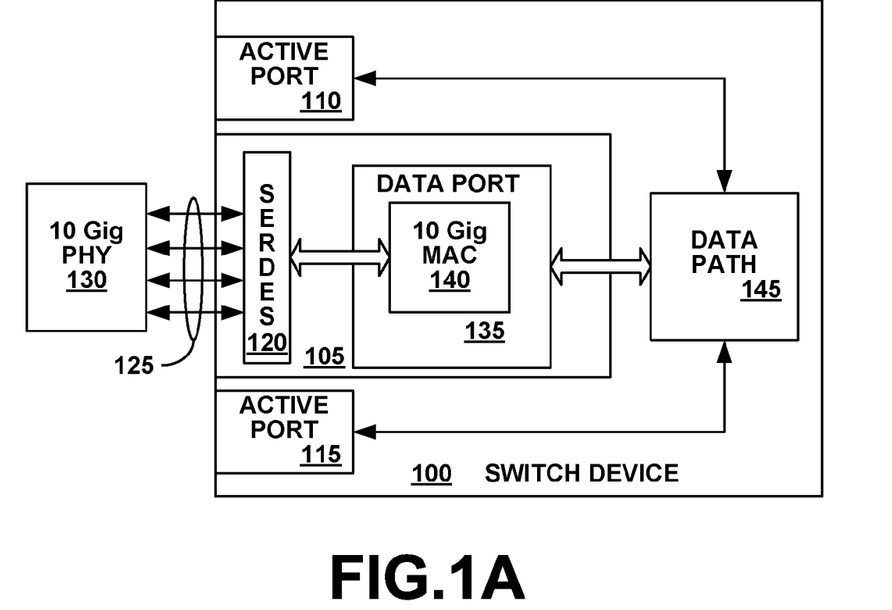
FIGS. 1A and 1B are block diagrams illustrating a switch device configured to operate in a first mode of functionality and a second mode of functionality in accordance with an example embodiment.
Figure 1B:
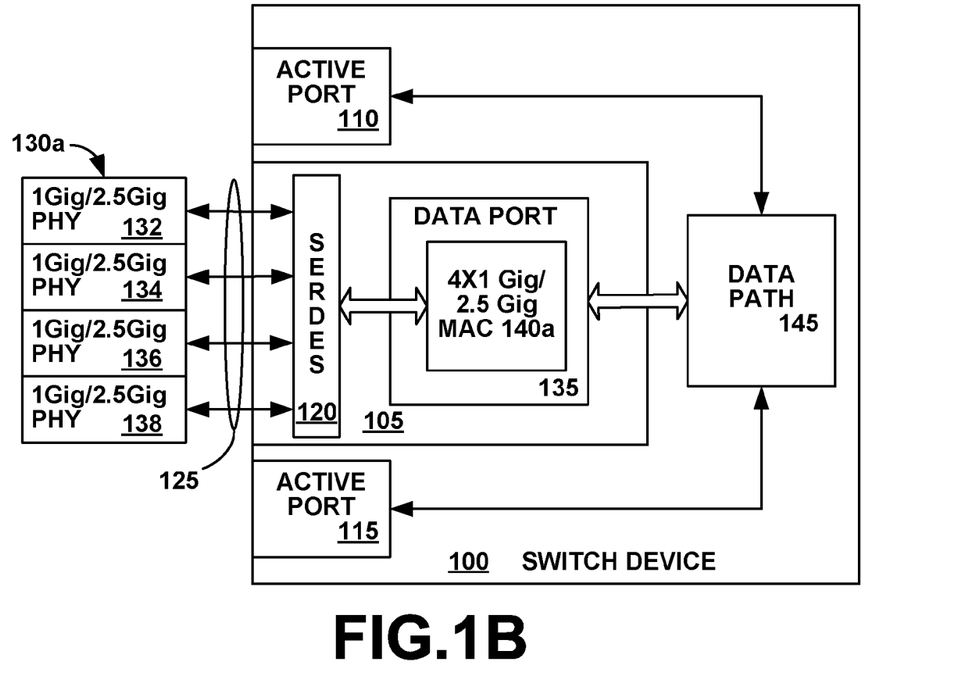

FIGS. 1A and 1B are block diagrams that illustrate a network device (e.g., network switch) 100 in accordance with an example embodiment. In FIG. 1A, the network device 100 is configured to operate in first mode of functionality, i.e., as a 10 Gigabit/second (Gig) network data link using four individual 1/2.5 Gig traffic lanes. In FIG. 1B, the network device 100 is configured to operate in a second mode of functionality, i.e., where the network data link operates as four individual 1/2.5 Gig traffic lanes after being hot-swapped from one mode of functionality to another.

As shown in FIG. 1A, the network switch 100 includes a network port 105. The network port 105 is configured to be hot-swapped between a first mode of functionality (single 10 Gig) and a second mode of functionality (four individual 1/2.5 Gig). It will be appreciated that the designations of the first mode of functionality and the second mode of functionality are arbitrary and, depending on the particular situation, may be reversed. The switch 100 also includes a network port 110 and a network port 115. In an example embodiment, the network ports 110 and 115 remain active while the network port 105 is hot-swapped between modes of functionality, such as using the techniques described herein.

The data port 105 includes a serializer/de-serializer (SERDES) 120 that may be used to de-serialize incoming data (convert serial data to parallel data) and to serialize outgoing data (convert parallel data to serial data) for the data port 105. In FIG. 1A, the SERDES 120 may receive serial data, from a 10 Gig physical layer interface (PHY) 130 over four 2.5 Gig traffic lanes 125. In the switch 100, the SERDES 120 is operationally coupled with a data port 135 of the network port 105. The data port 135 includes a 10 Gig media access controller (MAC) that receives incoming data and processes the incoming data prior to communicating the incoming data to a data path 145. In the switch 100, the data path 145 may be used to switch data received from the MAC 140 to an appropriate outgoing network port of the switch device 100 for communication to a destination address. For purposes of brevity and clarity, the operation of the MAC 140 and the data path 145 are not described in detail, except with respect to the details of the techniques for hot-swapping modes of functionality described herein.

In FIG. 1B, the network switch 100 is illustrated after being hot-swapped from operating in a 10 Gig mode of functionality to operating in a second mode of functionality where the four 2.5 Gig traffic lanes 125 operate as individual 1/2.5 Gig traffic lanes. As was previously discussed, the modes of functionality may be reversed and the network port 105 may also be hot-swapped from operating with the four 2.5 Gig traffic lanes 125 operate as individual 1/2.5 Gig traffic lanes to operating in a 10 Gig mode of functionality. Furthermore, other modes of functionality may be implemented by the data port 105 and the techniques described herein may be used to hot-swap between those modes of functionality.

As shown in FIG. 1B, the 10 Gig PHY 130 of FIG. 1A has been replace with a PHY 130a that includes four individual 1/2.5 Gig PHYs 132, 134, 136 and 138. The PHYs 130 and 130a may be implemented on separate devices (e.g., daughter cards) that are physically swapped or, alternatively, may be implemented on a single physical device and enabled/disabled as appropriate, such as using a multiplexer or multiplexers.

As also shown in FIG. 1B, the 10 Gig MAC 140 has been switched to a 4×1/2.5 Gig MAC 140a that is also included in the data port 135 of the network port 105. As discussed in further detail below, as part of hot-swapping modes of functionality for the network port 105, the MAC 140 may be disabled in the data port 135 and the MAC 140a may be enabled. As noted above, the network ports 110 and 115 (and any other network ports included in the switch 100) may remain active while hot-swapping modes of functionality for the network port 105. As discussed in further detail below, the operation of other elements of the switch device 100 may be modified as part of hot-swapping from one mode of functionality to another. For instance, the operation of the SERDES 120 may be modified as well as operation of the data path 145.

Figure 2:
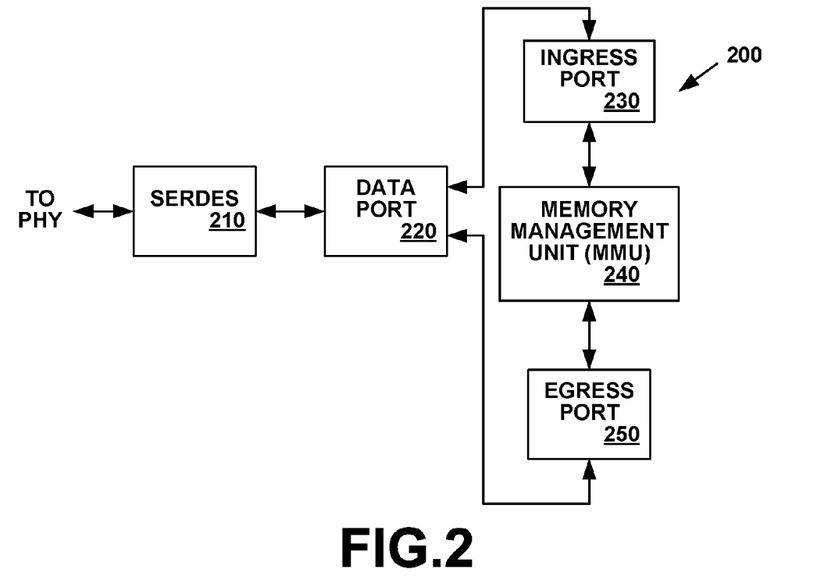
FIG. 2 is a block diagram illustrating a network data link in accordance with an example embodiment.

FIG. 2 illustrates a network port data path 200 that may be implemented as the network port 105 and data path 145 in FIGS. 1A and 1B. The path 200 includes a SERDES 210 that may be operationally coupled with a PHY (e.g., a 10 Gig PHY or a 4×1/2.5 Gig PHY). In the path 200, the SERDES 210 is operationally coupled with a data port 220. Depending on the mode of functionality that the path 200 is operating in, the data port 220 may operate with an appropriate MAC, such as the 10 Gig MAC 140 or the 4×1/2.5 Gig MAC 140a, as illustrated, respectively, in FIGS. 1A and 1B.

In the path 200, the data port 220 is operationally coupled with an ingress port (IP) 230, a memory management unit (MMU) 240 and an egress port (EP) 250. In a switch device, such as the switch 100, the IP 230, the MMU 240 and the EP 250 may be shared between a plurality of network ports included in the switch device 100. For instance, incoming data may be communicated from the plurality of network ports to the IP 230, then to the MMU 240 and then to the EP 250. In the switch 100, the IP 230, the MMU 240 and the EP 250 may be used to switch data from an incoming network port to an appropriate outgoing network port for communication to a destination network address that is associated with the data. For instance, referring to FIG. 1A, data may be received via the network port 105 and, using the path 200, may be switched to the network port 110 for communication to a destination address.

Figure 3:
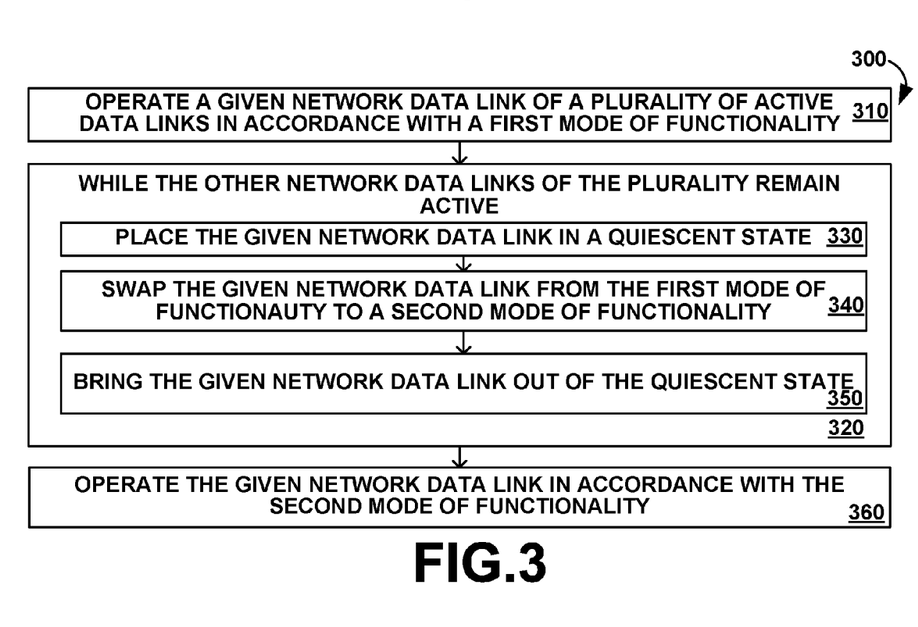
FIG. 3 is a flowchart illustrating a method of hot-swapping a network data link from a first mode of functionality to a second mode of functionality in accordance with an example embodiment.

FIG. 3 is a flowchart illustrating a method 300 of hot-swapping modes of functionality for a network port (network data link) in accordance with an example embodiment. The method 300 may be implemented using the apparatus illustrated in FIGS. 1A, 1B and 2. Thus, for purposes of illustration, the method 300 will be described with further reference to FIGS. 1A, 1B and 2. It will be appreciated, however, that the method 300 (and each of the methods described herein) may be implemented in any number of appropriate network devices that include a plurality of network ports (network data links).

The method 300 includes, at block 310, operating a given network data link, such as using the network port 105, in a first mode of functionality. As previously discussed, the network port 105 may be one of a plurality of active network ports that are operating on a network switch 100, where the plurality of network ports may also include the network ports 110 and 115. At block 320, the method 300 includes hot-swapping the network port 105 from the first mode of functionality to a second mode of functionality while the other network ports 110 and 115 of the network switch 100 remain active. Example embodiments of method that may be used in each of the blocks included in block 320 of the method 300 are discussed in further details below with reference to FIGS. 4, 5 and 6, respectively.

In the method 300, hot-swapping modes of functionality for the network port 105 at block 320 includes, at block 330, placing the network port 105 in a quiescent state. At block 320, hot-swapping modes of functionality for the network port 105 further includes, at block 340, swapping the network port 105 from being configured to operate in accordance with the first mode of functionality to being configured to operate in accordance with the second mode of functionality.

Hot-swapping modes of functionality at block 320 further includes, at block 350, bringing the network port 105 out of the quiescent state to operate in the second mode of functionality. The method 300 further includes, at block 360, operating the network port 105 in accordance with the second mode of functionality. As discussed herein, the network port 105 (or any other appropriate network port) may be hot-swapped between any two appropriate modes of functionality. For instance, the network port 105 may be swapped from a 10 Gig functionality mode to operate in a second mode of functionality (e.g., as four individual 1/2.5 Gig traffic lanes). Of course, hot-swapping between other modes of functionality is possible using the techniques described herein.

In the network switch 100, where the path 200 of FIG. 2 is implemented as the network port 105 and the data path 145, the IP 230, the MMU 240 and the EP 250 may be configured to support the first mode of functionality and the second mode of functionality, as well as being configured to support hot-swapping between the modes of functionality. Example embodiments of such techniques are described in further details below.

For the technique illustrated in FIGS. 4-9, hot-swapping modes of functionality for a network data link will be described with respect to hot-swapping the network port 105 from operating in a 10 Gig mode of functionality to operating in a 4×1/2.5 Gig mode of functionality by way of illustrative example. It will be appreciated, however, that the described techniques may be used to hot-swap between any appropriate modes of functionality.

Figure 4:
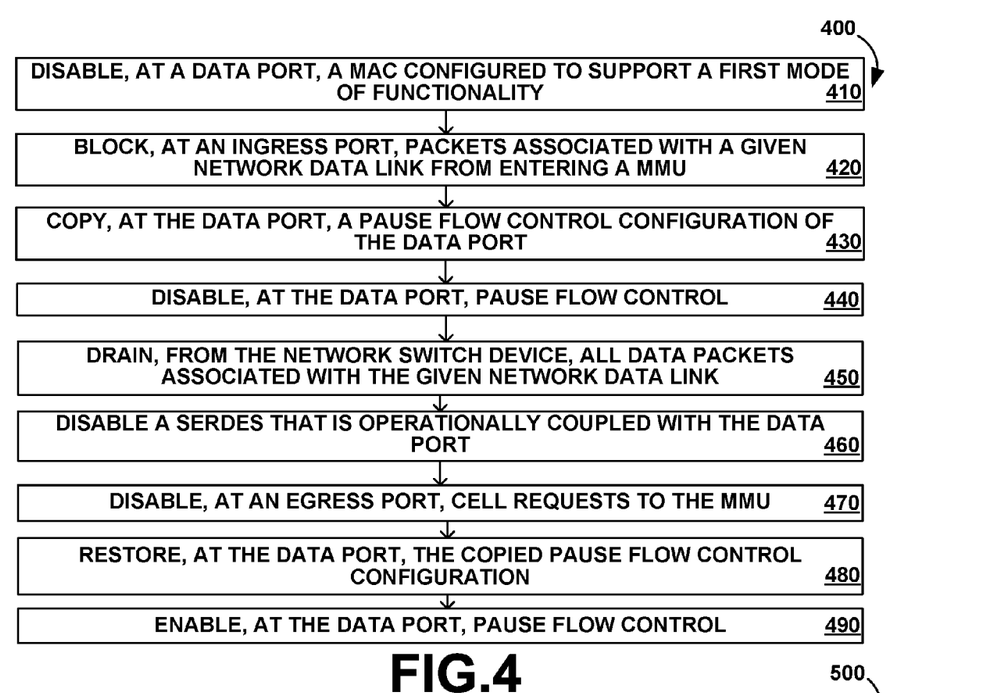
FIG. 4 is a flowchart illustrating a method of placing a network data link in a quiescent state in accordance with an example embodiment.

FIG. 4 is a flowchart illustrating a method 400 for placing a network data link in a quiescent state in accordance with an example embodiment. The method 400 may be implemented as block 330 of the method 300 illustrated in FIG. 3. As with the method 300, the method 400 may be implemented using the apparatus illustrated in FIGS. 1A, 1B and 2. Thus, for purposes of illustration, the method 400 will also be described with further reference to FIGS. 1A, 1B and 2.

In the method 400, the network port 105 may initially be operating in a 10 Gig mode of functionality, such as previously described and as illustrated in FIG. 1A. At block 410, the method 400 may include disabling, at the data port 135, the 10 Gig MAC 140. For instance, the MAC 140 may be disabled by clearing an enable bit in a MAC control register. This stops incoming traffic for the network port 105 from entering the data path 145 of the switch device 100.

The method 400 further includes, at block 420, blocking, at the IP 230, packets associated with the given network data link (network port 105) from entering the MMU 240. In an example embodiment, blocking packets from entering the MMU 240 may be accomplished by clearing a control bit in the IP 230 that is associated with the data port 105, effectively disabling the IP 230 for packets associated with the port 105, but leaving the IP 230 operating normally for other active network ports, such as the network ports 110 and 115.

At block 430, the method 400 includes copying a PAUSE flow control configuration of the data port 135 and, at block 440, disabling PAUSE flow control for the data port 135. Such an approach allows for pending packets associated with the network port 105 to flow through the MMU 240, regardless of the PAUSE flow control configuration, so that the packets may be cleared from the switch device 100.

At block 450, the method 400 includes draining, from the switch 100, all data packets associated with the network data port (link) 105, e.g., packets to be sent out of the switch 100 using the network port 105. The draining at block 450 may include processing pending packets through the data path 145, but then dropping the packets at the data port 135. The operations of blocks 410-450 clear both directions of packet data traffic for the network port 105. For instance, the operations at blocks 410 and 420 prevent new incoming data traffic from entering the path 200, while the operations at block 430-450 flush all outbound packets associated with the network port 105 from the path 200 in the switch 100.

At block 460, the method 400 includes disabling the SERDES 120 of the network port 105. In an example embodiment, the SERDES 120 can be disabled while packets are being drained at block 450 because those packets are dropped at the data port 135 and not communicated to the SERDES 120.

Once all packets associated with network port 105 are drained, the method 400 further includes, at block 470, disabling, at the EP 250, cell requests (request for packets) to the MMU 240. In an example embodiment, the EP 250 may request packets from the MMU 240 for the network port 105 (when active) by sending credits to the MMU 240 when corresponding cell buffer space is available in the EP 250. Disabling cell requests from the EP 250 to the MMU 240 for the network port 105 will result in the EP 250 not sending credits to the MMU 240 even when the EP 250 has cell buffer space available for packets associated with the network port 105. The EP 250 may, however, continue to send credits to the MMU 240 to obtain packets associated with active network ports 110 and 115 of the switch 100.

The method 400 further includes, at block 480 restoring, at the data port, the PAUSE flow control configuration that was copied at block 430 and, at block 490 enabling, at the data port 135, PAUSE flow control with the restored PAUSE flow control configuration. This allows the network port 105 to continue to operate with the same PAUSE flow control configuration after hot-swapping modes of functionality as before the hot-swap.

Figure 5:
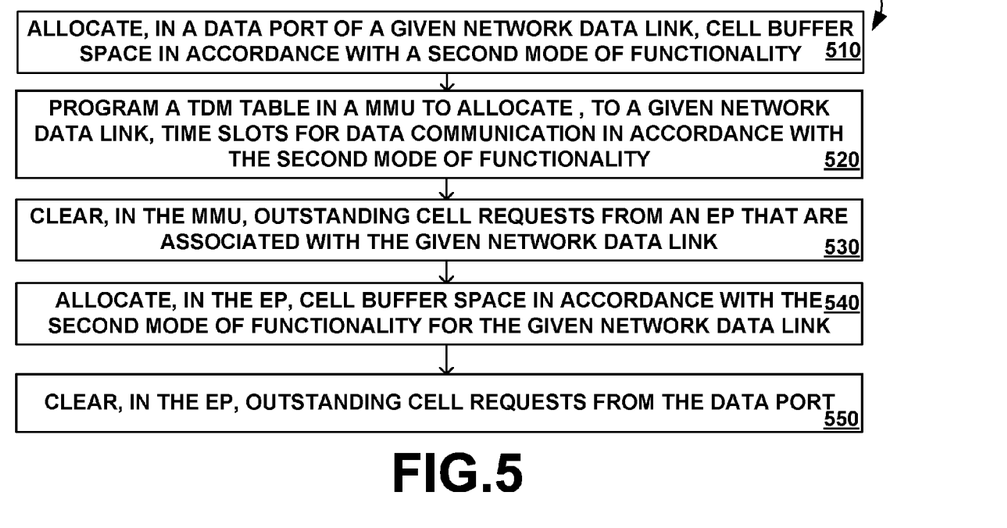
FIG. 5 is a flowchart illustrating a method of changing functionality of a network data link from a first mode of functionality to a second mode of functionality in accordance with an example embodiment.

FIG. 5 is a flowchart illustrating a method 500 for swapping modes of functionality for a network data link in accordance with an example embodiment. The method 500 may be implemented as block 340 of the method 300 illustrated in FIG. 3. As with the methods 300 and 400, the method 500 may be implemented using the apparatus illustrated in FIGS. 1A, 1B and 2. Thus, for purposes of illustration, the method 500 will also be described with further reference to FIGS. 1A, 1B and 2.

The method 500 includes, at block 510, allocating, in the data port 135 of a given network data link (port) 105, cell buffer space in accordance with the second mode of functionality. For instance, in the present example, a single cell buffer partition may be used when the network port is operating in the 10 Gig mode of functionality. When swapping to the 4×1/2.5 Gig mode of functionality, the cell buffer space in the data port 135 may be partitioned into four separate cell buffer partitions, one for each of the individual 1/2.5 Gig traffic lanes of the network data link. Example embodiments of such partitions are described in further detail below with respect to FIGS. 7A and 7B.

At block 520, the method 500 further includes programming a time division multiplex (TDM) table to allocate, to the network data link (port) 105, time slots for data communication in accordance with the second mode of functionality. For example, such a TDM table may be programmed to allocate communication time slots to each of the individual 1/2.5 Gig traffic lanes. This programming may also include removing time slots that were assigned to the network port 105 when it was operating in the 10 Gig mode of functionality. In one approach, the network port 105 may have 4 TDM table time slots allocated to it. When operating in the 10 Gig mode of functionality, all four of those time slots would be associated with (allocated to) the 10 Gig network port 105. When the network port 105 is hot-swapped to the 4×1/2.5 Gig mode of functionality, each of the four individual 1/2.5 Gig traffic lanes may have one of the network port 105's four time slots allocated to it.

At block 530, the method 500 includes clearing, in the MMU 240, outstanding cell requests from the EP 250 that are associated with the network port 105. Credits associated with those cell requests may be kept in a cell request register in the MMU 240, for example. Such an approach prevents duplicate cell requests from being issued when the network port 105 is removed from the quiescent state. An example TDM table and credit register that may be implemented in the MMU 240 are described in further detail below with respect to FIG. 9.

The method 500 also includes, at block 540, allocating, in the EP 250, cell buffer space for the network port 105 in accordance with the second mode of functionality. For instance, in the present example, a single cell buffer partition may be used in the EP 250 for the network port 105 when the network port is operating in the 10 Gig mode of functionality. When swapping to the 4×1/2.5 Gig mode of functionality, the cell buffer space in the EP 250 for the network port 105 may be partitioned into four separate cell buffer partitions, one for each of the individual 1/2.5 Gig traffic lanes of the network data link (port) 105.

At block 550, the method 500 includes clearing, in the EP 250, outstanding cell requests from the data port 135 that are associated with the network port 105. Credits associated with those cell requests may be kept in a cell request register in the EP 250, for example. Such an approach prevents duplicate cell requests from being issued from the data port 135 to the EP 250 when the network port 105 is removed from the quiescent state. Example embodiments of such EP cell buffer partitions and credit registers are described in further detail below with respect to FIGS. 8A and 8B.

Figure 6:
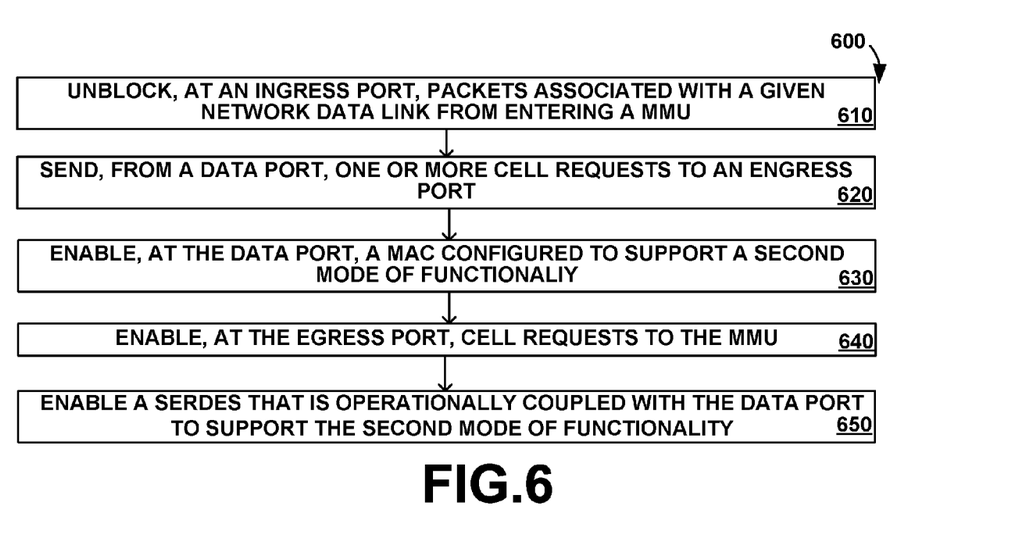
FIG. 6 is a flowchart illustrating a method of removing a network data link from a quiescent state in accordance with an example embodiment.

FIG. 6 is a flowchart illustrating a method 600 for removing a network data link from a quiescent state in accordance with an example embodiment. The method 600 may be implemented as block 350 of the method 300 illustrated in FIG. 3. As with the methods 300, 400 and 500, the method 600 may be implemented using the apparatus illustrated in FIGS. 1A, 1B and 2. Thus, for purposes of illustration, the method 600 will also be described with further reference to FIGS. 1A, 1B and 2.

The method 600 includes, at block 610, unblocking, at the IP 230, packets associated with the network data link (port) 105 from entering the MMU 240. Unblocking packets at block 610 will allow incoming data traffic associated with the network port 105 to enter the MMU 240 when such data traffic is received at the IP 230 from the data pot 135. At block 620, the method 600 also includes sending, from the data port 135, one or more cell requests to the EP 250. For instance, the data port 135 may be placed in a soft reset mode while the network port 105 is being swapped from one mode of functionality to another. When the data port 135 is taken out of the soft reset mode (e.g., as part of removing the network port 105 from the quiescent state), it may issue cell buffer requests to the EP 250 (e.g., send credits to the EP 250). As the credits sent to the EP 250 from the data port 135 are used to send packets to the data port 135, the available credits in the EP 250 are reduced. The data port 135 sends additional credits to the EP 250 when space becomes available in the data port 135's cell buffer. Credits issued from the EP 250 to the MMU 240 are used and issued in a similar fashion for cell requests from the EP 250 to the MMU 240.

The method 600 also includes, at block 630, enabling, at the data port 135, a MAC configured to support the second mode of functionality. For instance, when the data port 135 is being swapped from a 10 Gig mode of functionality to a 4×1/2.5 Gig mode of functionality, the MAC 140*a* shown in FIG. 1B may be enabled at block 630. At block 640, the method 600 includes enabling, at the EP 250, cell requests to the MMU 240. After execution of block 640, the EP 250 may issue cell requests to the MMU 240 for packets that are to be communicated to the data port 135 to be sent out of the switch 100 via the network port 105.

At block 650, the method 600 further includes enabling the SERDES 120 of the network port 105. In the method 600, the SERDES 120 is enabled, at block 650, such that it is configured to support the second mode of functionality. This configuration of the SERDES 120, as with the configuration of any of the elements of the switch 100, may be accomplished using a number of techniques, such as using software, hardware and/or firmware. In the example being described here, the SERDES 120, at block 650, is enabled to support the 4×1/2.5 Gig mode of functionality for the network port 105. In other embodiments, the SERDES 120, at block 650, may be enabled to support other modes of functionality, such as a 10 Gig mode of functionality, for example.

Figure 7A:
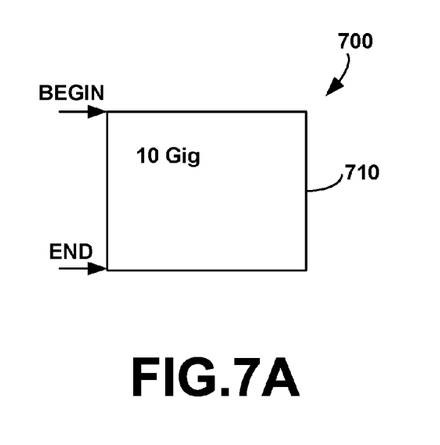
FIGS. 7A and 7B are diagrams illustrating cell buffer allocation for a data port in accordance with an example embodiment.
Figure 7B:
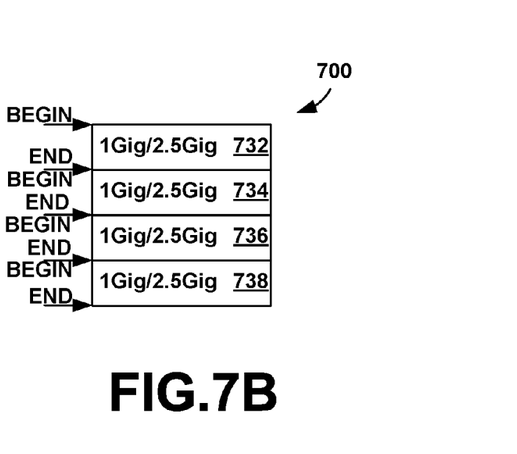

FIGS. 7A and 7B illustrate a data port cell buffer 700 in accordance with an example embodiment. The cell buffer 700 may be included in the data port 135 of the network port 105, as illustrated in FIGS. 1A and 1B. In FIG. 7A, the cell buffer 700 is configured for use in a 10 Gig mode of functionality for the network port 105 and in FIG. 7B, the cell buffer 700 is configured for use in a 4×1/2.5 Gig mode of functionality for the network port 105.

In FIG. 7A, the cell buffer 700 is configured as a single cell buffer partition 710. The single partition 710 is configured with Begin and End markers, respectively, at the beginning and the end of the partition 710. In FIG. 7B, the cell buffer 700 is portioned into four smaller partitions 732, 734, 736 and 738, one for each of the individual 1/2.5 Gig mode traffic lanes 125 coupled with the network port 105. Each partition 732, 734, 736 and 738 has respective Begin and End markers that are established during their configuration. When the network port 105 is hot-swapped between modes of functionality, the buffer 700 may be configured appropriately, such as illustrated in the fashions illustrated in FIGS. 7A and 7B, depending on the mode of functionality that the network port 105 is being hot-swapped to. For example, such configuration/allocation of the cell buffer 700 may be done at block 510 of the method 500 illustrated in FIG. 5.

Figure 8A:
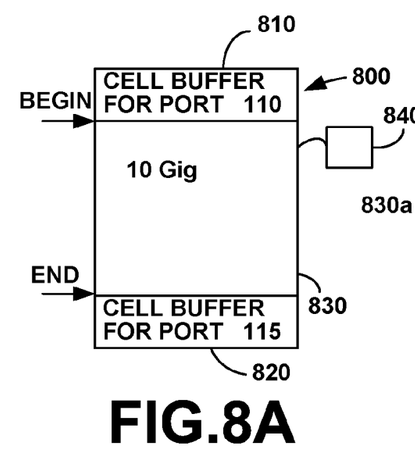
FIGS. 8A and 8B are diagrams illustrating cell buffer allocation for egress port in accordance with an example embodiment.
Figure 8B:
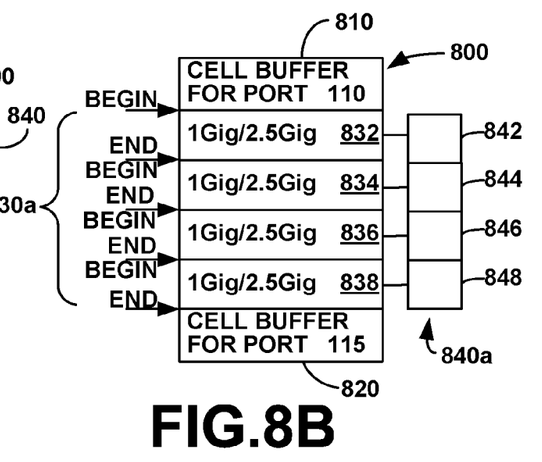

FIGS. 8A and 8B illustrate an EP cell buffer 800 in accordance with an example embodiment. The cell buffer 800 may be included in the EP 250 of the switch 100, as illustrated in FIGS. 1A, 1B and 2. In FIG. 8A, the cell buffer 800 is configured for use in a 10 Gig mode of functionality for the network port 105 and in FIG. 8B, the cell buffer 800 is configured for use in a 4×1/2.5 Gig mode of functionality for the network port 105.

As was discussed above, the EP 250 may be shared by a plurality of network ports in the switch 100. Thus, in an example embodiment, only a portion of the cell buffer 800 may be used for packet data associated with the network port 105. As shown in FIG. 8A, the cell buffer 800 includes a cell buffer partition 810 that is associated with the network port 110 and a cell buffer partition 820 that is associated with the network port 115. In FIG. 8A, the cell buffer 800 also includes a cell buffer partition 830 that may be associated with the network port 105 when operating in a 10 Gig mode of functionality. The cell buffer partition 830 is also operatively coupled with a cell request credit register 840 that may be used to keep track of available cell request credits received from the data port 135. The cell request credits may be used and issued in the fashion previously described. Also, as was discussed above, the cell credit register 840 may be cleared when hot-swapping the network port 105 from one mode of functionality to another.

In FIG. 8B, the cell buffer 800 is configured for use in a 4×1/2.5 Gig mode of functionality for the network port 105. As with the configuration of the cell buffer 800 illustrated in FIG. 8A, the configuration illustrated in FIG. 8B includes the partitions 810 and 820 that may be, respectively, associated with the network ports 110 and 115. In FIG. 8B, the cell buffer includes a cell buffer partition 810*a* that has four sub-partitions 832, 834, 836 and 838, one for each of the 1/2.5 Gig traffic lanes 125, such as shown in FIG. 1B. Each of the sub-partitions 832-838 may have respective Begin and End markers, where the End marker for one partition shares a common boundary with the Begin marker for the next logical and/or physical partition.

The cell buffer partition 830*a* in FIG. 8B is also operatively coupled with a cell request credit register 840*a* that may be used to keep track of available cell request credits received from the data port 135. The cell request credit register 840*a* includes separate entries 842, 844, 846 and 848 that may be associated, respectively, with each of the 1/2.5 Gig traffic lanes 125. Available credits for each of the traffic lanes 125 may be kept in the respective cell credit register entries 842-848 of the cell request credit register 840*a*. The cell request credits stored in the cell request credit register 840*a* may be used and issued in like fashion as has been previously described. As was also discussed above, the entries of the cell credit register 840a may be cleared when hot-swapping the network port 105 from one mode of functionality to another.

Figure 9:
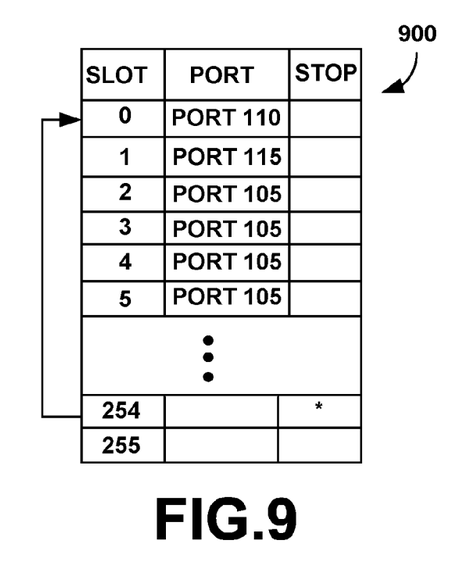
FIG. 9 is a diagram illustrating a time division multiplex table in accordance with an example embodiment.

FIG. 9 is a diagram illustrating a TDM table 900 that may be included in an MMU 240 in accordance with an example embodiment. The TDM table 900 may be included in the MMU 240 of the switch 100, as illustrated in FIGS. 1A, 1B and 2. The TDM table 900 may be programmed/configured for use in a 10 Gig mode of functionality for the network port 105 or programmed/configured for use in a 4×1/2.5 Gig mode of functionality for the network port 105, such as at block 520 of the method 500. Of course, other modes of functionality are possible and the TDM table 900 may be appropriately programmed/configured based on the particular mode of functionality being implemented.

The TDM table 900 includes rows for each time slot that may be allocated by the MMU 240, where the time slots are used to provide packets to the EP 250 (e.g., in response to cell requests from the EP 250). In the embodiment illustrated in FIG. 9, the TDM table 900 includes 256 rows (0-255), indicating the MMU 240 may allocate up to 256 time slots. The TDM table 900 also includes three columns, designated Slot, Port and Stop. The Slot column indicates the time slot being allocated, the Port column indicates which network port (or traffic lane) the time slot is allocated to and the Stop column is used to indicate the end of the allocation list. When allocating times slots to network ports, the MMU may proceed sequentially through the TDM table 900. When the MMU 240 reaches an entry in the TDM table 900 that has the stop bit set, the MMU 240 returns to the first row of the TDM table 900 (i.e., Slot 0) and again begins allocating times slots in sequence.

As indicated in the table 900, Slot 0 is allocated to the network port 110 of the switch 100 shown in FIG. 1 and Slot 1 is allocated the network port 115 of FIG. 1. As also indicated in the TDM table 900, Slots 2-5 are allocated to the network port 105. Depending on the mode of functionality the port 105 is operating in, these allocations may be, for example, for a single 10 Gig port (i.e., when the data port 105 is operating in a 10 Gig mode of functionality). Alternatively, the Slots 2-5 may be allocated, respectively, to the individual 1/2.5 Gig traffic lanes 125 (i.e., when the data port 105 is operating in a 4×1/2.5 Gig mode of functionality). As mentioned above, the TDM table 900 may also be configured for use with other modes of functionality in addition to a 10 Gig mode and a 4×1/2.5 Gig mode.

As was previously discussed, the MMU 240 may receive cell request credits from the EP 250. These cell request credits may be stored, used and tracked in a cell request credit register that is implemented in the MMU 240 in similar fashion as the cell request registers 840 and 840a that were discussed above with respect to FIG. 8.

Figure 10:
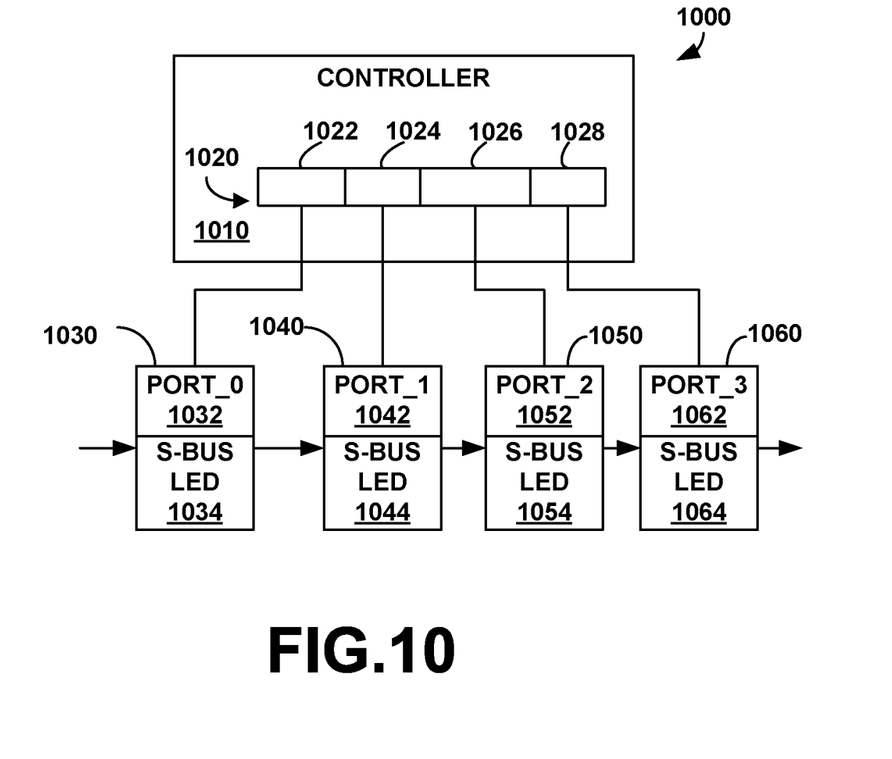
FIG. 10 is a diagram illustrating a network switch device in accordance with an example embodiment.

FIG. 10 is a block diagram illustrating a network device 1000 that may be used to implement the techniques described herein. The network device 1000 includes a controller 1010 that may include instructions that are used by elements of the network device 1000 for swapping network ports between modes of functionality. Accordingly, in the case of a switch device such as the switch 100 illustrated in FIG. 1, the controller 1010 may communicate with data ports, an IP, an MMU and an EP of the network device 1010 (not shown in FIG. 10), such as were described.

As shown in FIG. 10, the controller 1010 includes a data port soft-reset control register 1020. The control register 1020 includes entries 1022, 1024, 1026 and 1028 that may be use for soft resetting respective data ports.

The network device 1000 also includes data port blocks 1030, 1040, 1050 and 1060. Each data port 1030, 1040, 1050 and 1060 includes two sub-portions, a data port and a status bus (S-bus)/light emitting diode (LED) block. For instance, the data port block 1030 includes data port PORT_0 1032 and S-bus/LED block 1034. Likewise, the data port block 1040 includes data port PORT_1 1042 and S-bus/LED block 1044; the data port block 1050 includes data port PORT_2 1052 and S-bus/LED block 1054; and the data port block 1060 includes data port PORT_3 1062 and S-bus/LED block 1064. Each of the S-bus/LED blocks is coupled in serial fashion, such that status information for each of the data port blocks 1030, 1040, 1050 and 1060 may be obtained in a serial fashion. Such an approach is often advantageous from a system/network management standpoint as the network device 1000 may continue to operate while status information is obtained.

The entries of the control register 1020 are coupled respectively with the data port portions of the data port blocks 1030, 1040, 1050 and 1060. By setting an entry of the control register 1020, the corresponding data port may be placed in soft reset in order to hot-swap an associated data port from one mode of functionality to another, such as using the techniques described herein.

In the network device 1000, the S-bus/LED blocks are not affected by a soft reset of their associated data ports. Therefore, using an approach such as the one illustrated in FIG. 10 allows the S-bus/LED blocks to continue to operate when a network port is being hot-swapped from one mode of functionality to another and an associated data port is placed in a quiescent mode. If the S-bus/LED block was reset along with its corresponding data port, the entire S-bus/LED chain would cease to function when any of the data port blocks were in reset, such as to swap modes of functionality.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the embodiments of the invention.

What is claimed is:

1. A method for swapping functionality in a network switch device, the method comprising:
    swapping functionality of a given network data link of a plurality of network data links supported by the network switch, while other network data links of the plurality of data links are active, by:
    operating the given network data link in accordance with the first mode of functionality;
    placing the given network data link in a quiescent state by copying, at a data port, a pause flow control configuration of the data port before draining all the data packets associated with the given network data link;
    converting the given network data link from the first mode of functionality to the second mode of functionality;
    bringing the given network data link out of the quiescent state; and
    operating the given network data link in accordance with the second mode of functionality.

2. The method of claim 1, further comprising:
    prior to bringing the given network data link out of the quiescent state:
        clearing, in a memory management unit (MMU), outstanding cell requests from an egress port (EP) that are associated with the given network data link; and
        clearing, in the EP, outstanding cell requests from a data port.

3. The method of claim 1, wherein:
    operating the given network data link in accordance with the first mode of functionality comprises operating the given network data link as a plurality of 2.5 Gigabit/second data links; and
    operating the given network data link in accordance with the second mode of functionality comprises operating the given network data link as a single 10 Gigabit/second data link.

4. The method of claim 1, wherein:
    operating the given network data link in accordance with the first mode of functionality comprises operating the given network data link as a single 10 Gigabit/second data link; and
    operating the given network data link in accordance with the second mode of functionality comprises operating the given network data link as a plurality of 2.5 Gigabit/second data links.

5. The method of claim 1, wherein:
    placing the given network data link in a quiescent state comprises disabling a first media access controller (MAC) included in the data port, the first MAC operating in accordance with the first mode of functionality; and
    bringing the given network data link out of the quiescent state comprises enabling a second MAC included in the data port, the second MAC operating in accordance with the second mode of functionality.

6. The method of claim 5, wherein placing the given network data link in a quiescent state further comprises:
    blocking, at an ingress port of the network switch device, packets associated with the given network data link from entering a memory management unit (MMU) of the network switch device;
    disabling, at a data port, a media access controller (MAC) configured to support the first mode of functionality;
    draining, from the network switch device, all data packets associated with the given network data link; and
    disabling, at an egress port (EP), cell requests to the MMU.

7. The method of claim 6, further comprising:
    prior to draining all the data packets associated with the given network data link:
        disabling, at the data port, pause flow control; and
    subsequent to disabling cell requests to the MMU:
        restoring, at the data port, the copied pause flow control configuration; and
        enabling, at the data port, pause flow control.

8. The method of claim 6, further comprising:
    subsequent to blocking packets associated with the given network data link, disabling a serializer/de-serializer that is operationally coupled with a data port.

9. The method of claim 1, wherein bringing the given network data link out of the quiescent state comprises:
    unblocking, at an ingress port of the network switch device, packets associated with the given network data link from entering the MMU;
    sending, from a data port, one or more cell requests to an egress port (EP);
    enabling, at the data port, a media access controller (MAC) configured to support the second mode of functionality; and
    enabling, at the EP, cell requests to the MMU.

10. The method of claim 9, further comprising subsequent to enabling cell requests from the EP to the MMU, enabling a serializer/de-serializer that is operationally coupled with the data port to support the second mode of functionality.

11. The method of claim 1, wherein converting the given network data link from the first mode of functionality to the second mode of functionality comprises:
allocating, in a data port of the given network data link, cell buffer space in accordance with the second mode of functionality;
programming a memory management unit (MMU) of the network switch device in accordance with the second mode of functionality for the given network data link; and
allocating, in an egress port (EP) of the network switch device, cell buffer space in accordance with the second mode of functionality for the given network data link.

12. The method of claim 11, wherein programming the MMU comprises:
programming a time division multiplex table to allocate, to the given network data link, time slots for data communication in accordance with the second mode of functionality; and
clearing, in the MMU, outstanding cell requests from the EP that are associated with the given network data link.

13. The method of claim 11, wherein:
allocating, in the data port, cell buffer space in accordance with the second mode of functionality comprises allocating the cell buffer space of the data port as a single buffer space associated with a single 10 Gigabit/second data link that is implemented using the given network data link; and
allocating, in the EP, cell buffer space in accordance with the second mode of functionality comprises allocating the cell buffer space of the EP as a single buffer space associated with the single 10 Gigabit/second data link.

14. The method of claim 11, wherein:
allocating, in the data port, cell buffer space in accordance with the second mode of functionality comprises allocating the cell buffer space of the data port as multiple data port cell buffer partitions, each data port cell buffer partition being associated with a respective 2.5 Gigabit/second data link that is implemented using the given network data link; and
allocating, in the EP, cell buffer space in accordance with the second mode of functionality comprises allocating the cell buffer space of the EP as multiple EP cell buffer partitions, each EP cell buffer partition being associated, respectively, with one of the 2.5 Gigabit/second data links.

15. A network switch device for supporting a plurality of network data links, the network switch device comprising:
a plurality of data ports, each data port being associated with a respective network data link;
wherein the network switch device is configured to:
operate a given network data link of the plurality of network data links in accordance with a first mode of functionality;
place the given network data link in a quiescent state by copying, at a data port, a pause flow control configuration of the data port before draining all the data packets associated with the given network data link;
convert the given network data link from the first mode of functionality to a second mode of functionality;
bring the given network data link out of the quiescent state; and
operate the given network data link in accordance with the second mode of functionality.

16. The network switch device of claim 15, wherein the network switch device is further configured to:
place the given network data link in a quiescent state by blocking, at an ingress port of the network switch device, packets associated with the given network data link from entering a memory management unit (MMU) of the network switch device;
prior to bringing the given network data link out of the quiescent state:
clear, in the MMU, outstanding cell requests from an egress port (EP) that are associated with the given network data link; and
clear, in the EP, outstanding cell requests from the data port.

17. The network switch device of claim 15, further comprising:
an ingress port (IP) operationally coupled with the plurality of data ports and the MMU; and
an egress port (EP) operationally coupled with the MMU and the plurality of data ports.

18. A network switch device for supporting a plurality of network data links, the network switch device comprising:
a plurality of data ports, each data port being associated with a respective network data link;
an ingress port (IP) operationally coupled with the plurality of data ports;
a memory management unit (MMU) operationally coupled with the IP; and
an egress port (EP) operationally coupled with the MMU and the plurality of data ports, wherein one or more data ports of the plurality of data ports are configured to:
operate in a first mode of functionality;
be placed in a quiescent state by copying, at a data port, a pause flow control configuration of the data port before draining all the data packets associated with the given network data link; and
be brought out of the quiescent state to operate in a second mode of functionality;
wherein the IP, MMU and EP are configured to support the first mode of functionality and the second mode of functionality for the one or more data ports.

19. The network switch device of claim 18, further comprising one or more serializer/de-serializers each respectively coupled with the one or more data ports, the one or more serializer/de-serializers being configured to support the first mode of functionality and the second mode of functionality.

20. The network switch device of claim 18, further comprising:
a status-bus (S-bus) chain operationally coupled with each of the plurality of data ports; and
a light-emitting diode (LED) chain operationally coupled with each of the plurality of data ports,
wherein the S-bus chain and the LED chain are configured to operate while any of the plurality of data ports are in the quiescent state.

* * * * *